United States Patent
Bunker

(10) Patent No.: US 10,830,051 B2
(45) Date of Patent: Nov. 10, 2020

(54) ENGINE COMPONENT WITH FILM COOLING

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 14/966,030

(22) Filed: Dec. 11, 2015

(65) Prior Publication Data

US 2017/0167268 A1 Jun. 15, 2017

(51) Int. Cl.
*F01D 5/18* (2006.01)
*F01D 25/12* (2006.01)

(52) U.S. Cl.
CPC ............ *F01D 5/186* (2013.01); *F01D 25/12* (2013.01); *F05D 2220/32* (2013.01); *F05D 2240/12* (2013.01); *F05D 2240/127* (2013.01); *F05D 2240/30* (2013.01); *F05D 2240/35* (2013.01); *F05D 2260/202* (2013.01); *F05D 2260/2212* (2013.01); *Y02T 50/60* (2013.01)

(58) Field of Classification Search
CPC .................. F23R 2900/03045; F01D 5/186
See application file for complete search history.

(56) References Cited

U.S. PATENT DOCUMENTS

| | | | |
|---|---|---|---|
| 4,514,144 A | 4/1985 | Lee | |
| 5,052,889 A * | 10/1991 | Abdel-Messeh | F01D 5/187 165/170 |
| 5,624,231 A | 4/1997 | Ohtomo et al. | |
| 5,695,321 A | 12/1997 | Kercher | |
| 6,129,515 A | 10/2000 | Soechting et al. | |
| 6,331,098 B1 * | 12/2001 | Lee | F01D 5/187 416/97 R |
| 6,474,947 B1 | 11/2002 | Yuri | |

(Continued)

FOREIGN PATENT DOCUMENTS

| CN | 86105250 A | 2/1988 |
|---|---|---|
| CN | 1749534 A | 3/2006 |

(Continued)

OTHER PUBLICATIONS

Extended European Search Report and Opinion issued in connection with corresponding EP Application No. 16202273.5 dated Apr. 20, 2017.

(Continued)

*Primary Examiner* — Todd E Manahan
*Assistant Examiner* — Katheryn A Malatek
(74) *Attorney, Agent, or Firm* — McGarry Bair PC

(57) ABSTRACT

An engine component can comprise a cooled surface adjacent to a cooling flow and a hot surface adjacent to a hot flow of fluid. The component can comprise a wall separating the hot and cooling flows, defining the cooled surface and the hot surface, and having a plurality of film holes disposed in the wall. At least one turbulator and at least one film hole inlet can be disposed on the cooled surface. The turbulator and the inlet can be arranged to provide a steady flow of cooling fluid to the film hole. One arrangement can comprise spacing the film hole inlet at least two turbulator heights from the turbulator.

13 Claims, 8 Drawing Sheets

(56) References Cited

U.S. PATENT DOCUMENTS

| | | |
|---|---|---|
| 8,414,263 B1 | 4/2013 | Liang |
| 2006/0056969 A1 | 3/2006 | Jacala et al. |
| 2009/0047136 A1 | 2/2009 | Chon et al. |
| 2016/0265775 A1* | 9/2016 | Cunha .................... F23M 5/00 |
| 2017/0145831 A1 | 5/2017 | Bunker |
| 2017/0145921 A1 | 5/2017 | Bunker |
| 2017/0159449 A1 | 6/2017 | Bhuler et al. |
| 2017/0159450 A1 | 6/2017 | Bhuler et al. |
| 2017/0159452 A1 | 6/2017 | Bunker et al. |

FOREIGN PATENT DOCUMENTS

| | | |
|---|---|---|
| EP | 0 661 414 A1 | 7/1995 |
| EP | 1 111 190 A1 | 6/2001 |
| JP | 2006-214324 A | 8/2006 |
| JP | 2006214324 A * | 8/2006 |

OTHER PUBLICATIONS

Unofficial English Translation of Chinese Office Action issued in connection with corresponding CN Application No. 201611128981.3 dated Apr. 20, 2018.

* cited by examiner

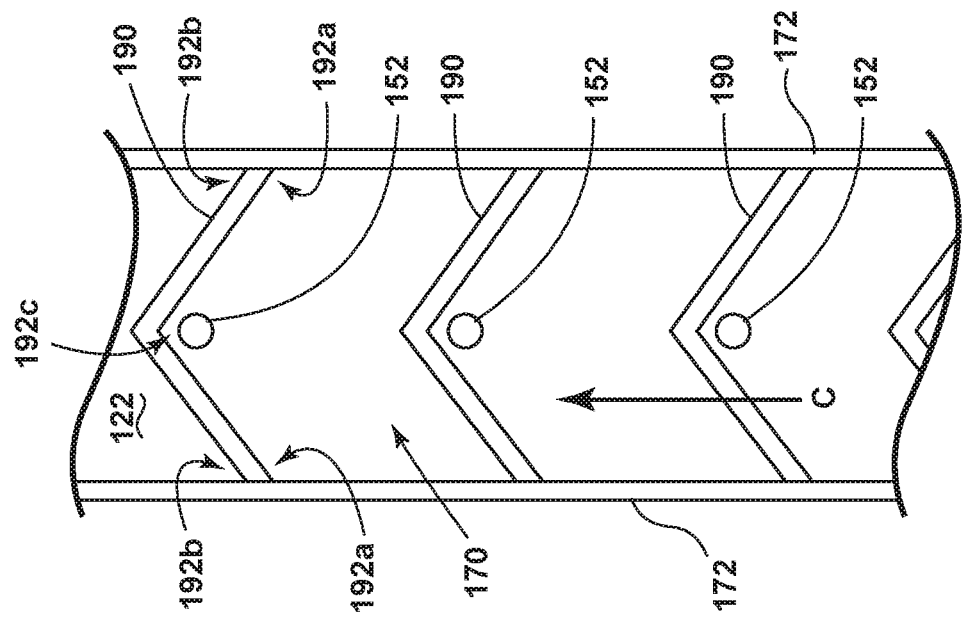
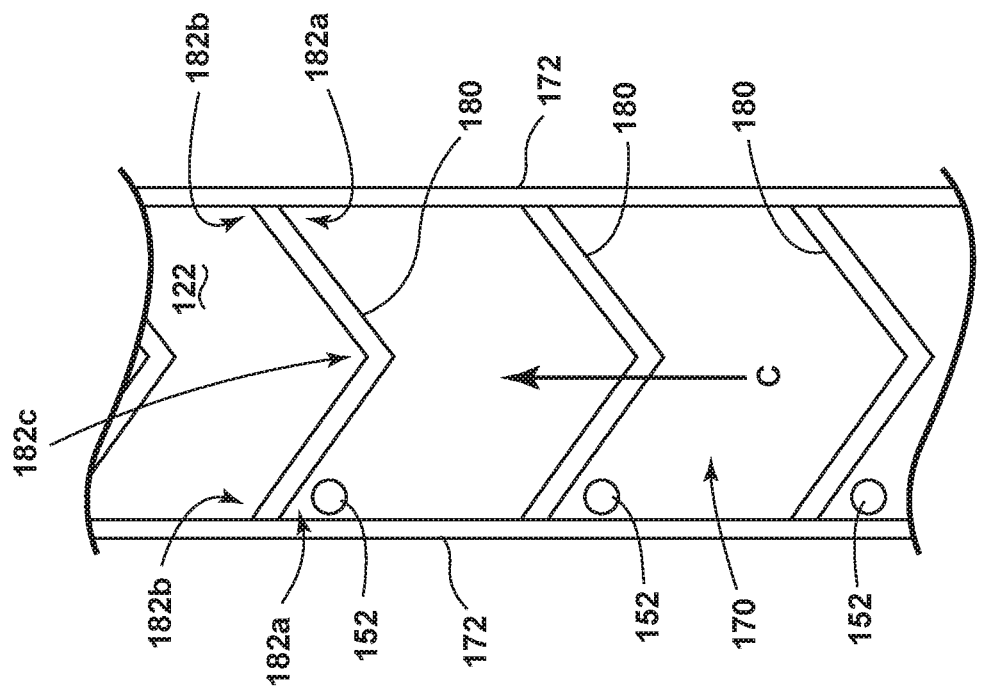

ENGINE COMPONENT WITH FILM COOLING

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Turbulators on a surface adjacent to the cooling flow have been used as a thermal cooling feature, however the turbulators tend to generate an unsteady or vortical airflow as the cooling flow passes through or over them, which can disrupt additional cooling feature dependent on the cooling fluid flow.

BRIEF DESCRIPTION OF THE INVENTION

In one aspect, an engine component for a gas turbine engine, which generates a hot combustion gas flow, and provides a cooling fluid flow, comprising a wall separating the hot combustion gas flow from the cooling fluid flow and having a hot surface along with the hot combustion gas flows in a hot flow path and a cooled surface facing the cooling fluid flow. The engine component further comprises at least one turbulator extending away from the cooled surface to define a turbulator height and a front confronting the cooling fluid flow and a rear obverse to the cooling fluid flow. The engine component further comprises at least one film hole having an inlet provided on the cooled surface, an outlet provided on the hot surface, and a passage connecting the inlet and the outlet wherein the inlet is spaced within at least two turbulator heights from the turbulator.

In another aspect, a method of cooling a cavity within a component of a gas turbine engine comprising directing air into an inlet of a film hole within two heights of a turbulator located downstream of the inlet.

In yet another aspect, an engine component for a gas turbine engine, which generates a hot combustion gas flow, and provides a cooling fluid flow, comprising a wall separating the hot combustion gas flow from the cooling fluid flow and having a hot surface along with the hot combustion gas flows in a hot flow path and a cooled surface facing the cooling fluid flow and a channel formed in the cooled surface extending in a flow-wise direction. The engine component further comprises multiple turbulators located within the channel and extending away from the cooled surface to define a turbulator height and a front confronting the cooling fluid flow and a rear obverse to the cooling fluid flow, and multiple film holes having an inlet provided on the cooled surface, an outlet provided on the hot surface, and a passage connecting the inlet and the outlet. At least one of the inlets is located upstream of one of the turbulators within at least two turbulator heights.

BRIEF DESCRIPTION OF THE DRAWINGS

In the drawings:

FIG. 8 is a top view of the engine component of FIG. 3 illustrating film hole inlets disposed relative to a plurality of chevrons.

FIG. 9 is a top view of the engine component of FIG. 3 illustrating film hole inlets upstream of a center corner of a chevron.

DESCRIPTION OF EMBODIMENTS OF THE INVENTION

Figure 1:
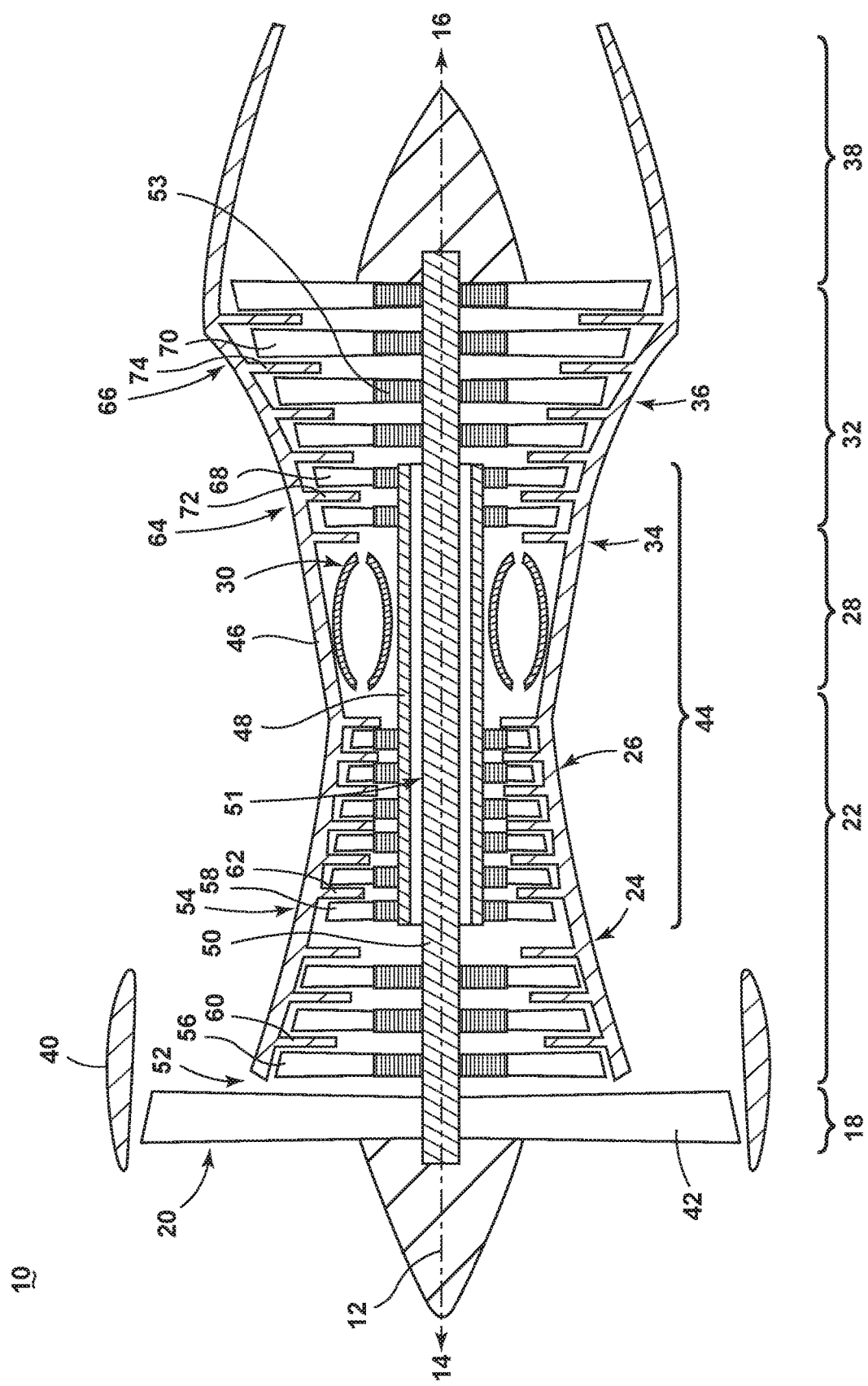
FIG. 1 is a schematic view of a gas turbine engine.

The described embodiments of the present invention are directed to apparatuses, methods, and other devices related to routing airflow in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

It should be further understood that for purposes of illustration, the present invention will be described with respect to an airfoil for a turbine blade of the turbine engine. It will be understood, however, that the invention is not limited to the turbine blade, and can comprise any airfoil structure, such as a compressor blade, a turbine or compressor vane, a fan blade, a strut, a shroud assembly, combustor deflector, or a combustor liner or any other engine component requiring cooling in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

Furthermore, as used herein, the terms "stream-wise" or "streamline," or similar nomenclature when used with flow, fluid, gas, location, or alignment refers to a fluid or gas flow direction which can be linear or a vector of the flow where the flow is non-linear, where the direction of the flow is moving at any position or point in time.

Furthermore, as used herein, the term "flow element" can comprise a turbulator, chevron, channel, pin bank, mesh, cooling passage, or any other element which can influence or affect a change in the streamline flow within an engine component.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
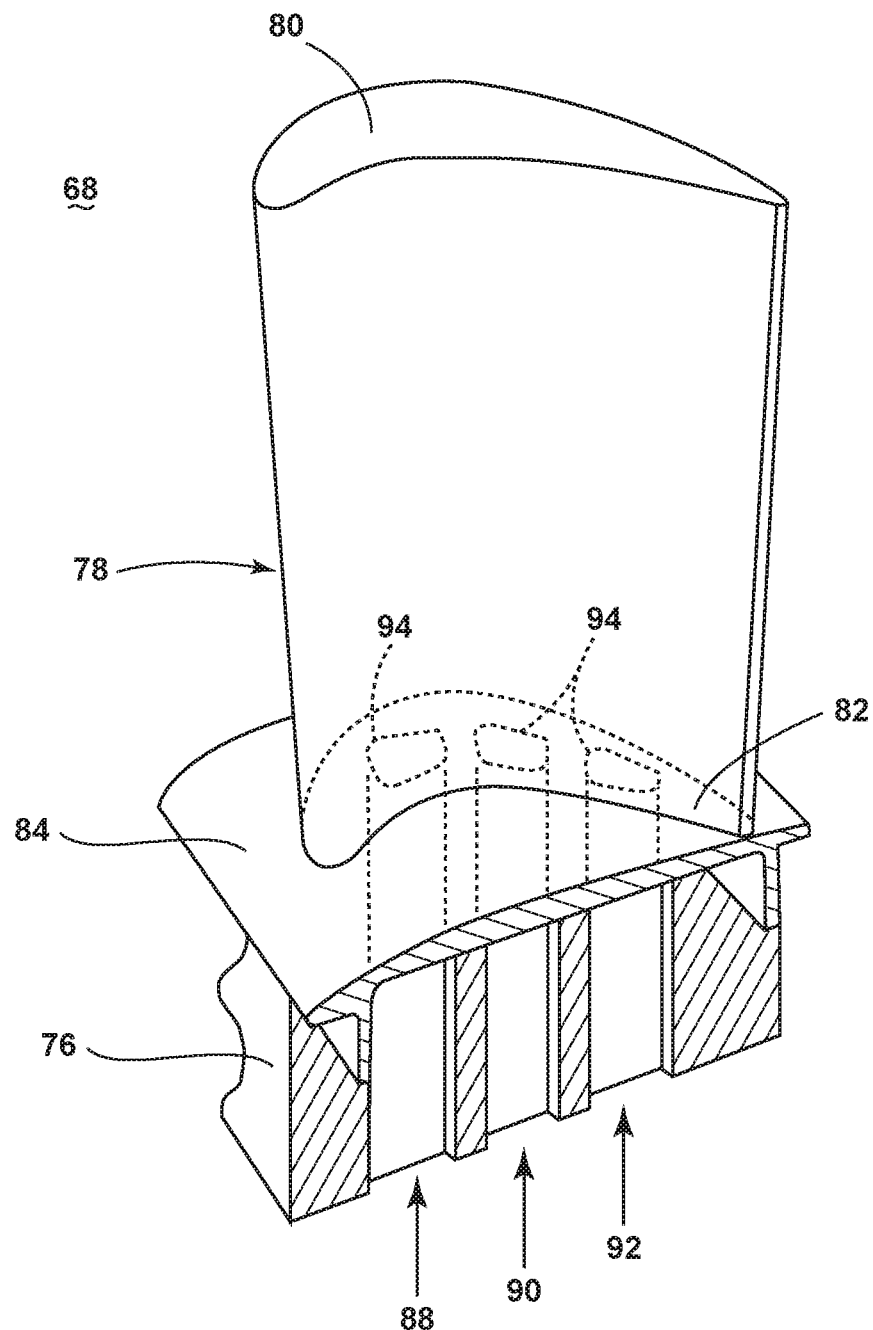
FIG. 2 is a perspective view of an engine component in the form of a turbine blade of the engine of FIG. 1.

FIG. 2 is a perspective view of an engine component in the form of one of the turbine blades 68 of the engine 10 from FIG. 1. The turbine blade 68 includes a dovetail 76 and an airfoil 78. The dovetail 76 can be configured to mount to a turbine rotor disk on the engine 10. The airfoil 78 extends from a tip 80 to a root 82 defining a span-wise direction. The dovetail 76 further includes a platform 84 integral with the airfoil 78 at the root 82, which helps to radially contain the turbine airflow. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. The inlet passages 88, 90, 92 as shown are exemplary should not be understood as limiting. More or less inlet passages can be used to provide a flow of fluid internal of the airfoil 78. It should be appreciated that the dovetail 76 is shown in cross-section, such that the inlet passages 88, 90, 92 are housed within the body of the dovetail 76. It should be further appreciated that as described herein, the engine component is described as an airfoil 78, however, this should not be construed as limiting and additional engine components such as a blade, vane, strut, or shroud assembly, in non-limiting examples, can be substituted for the airfoil.

Figure 3:
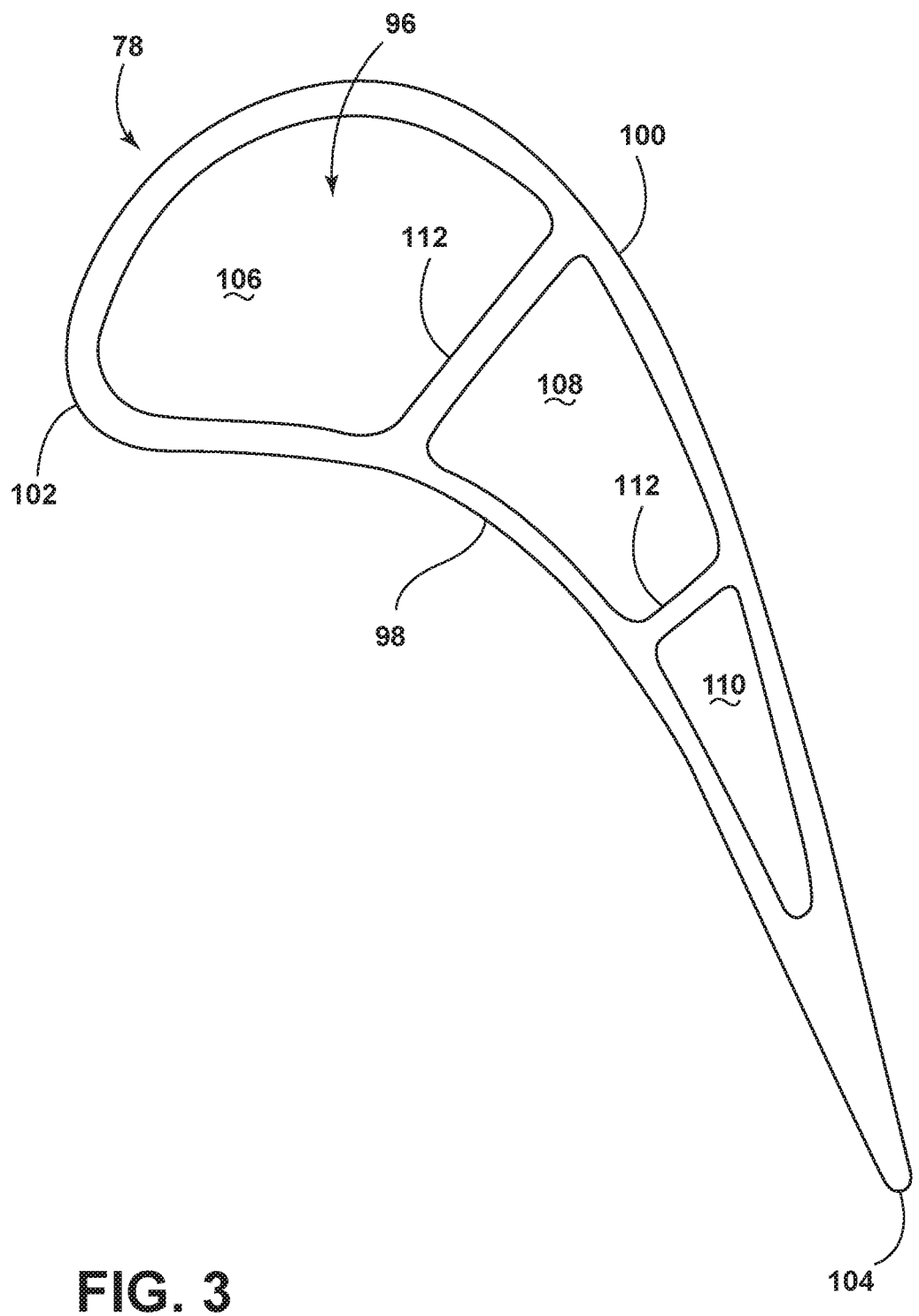
FIG. 3 is a cross-sectional view of the blade of FIG. 2 illustrating internal cooling passages.

Turning to FIG. 3, the airfoil 78, shown in cross-section, has an outer wall defining a concave-shaped pressure wall 98 and a convex-shaped suction wall 100 which are joined together to define an airfoil shape. A leading edge 102 and a trailing edge 104 define a chord-wise direction extending therebetween. The airfoil 78 rotates in a direction such that the pressure wall 98 follows the suction wall 100. Thus, as shown in FIG. 3, the airfoil 78 would rotate upward toward the top of the page.

The airfoil 78 comprises an interior 96 defined by a first cooling passage 106, a second cooling passage 108, and a third cooling passage 110. A flow of fluid, such as a cooling fluid, can pass within the cooling passages 106, 108, 110 providing cooling to the airfoil 78. The passages 106, 108, 110 can be defined and separated by one or more ribs 112 extending between the sidewalls of the airfoil 78. The passages 106, 108, 110 and ribs 112 can define interior surfaces for providing airflow or cooling elements in utilizing the flow within the passages 106, 108, 110.

While we show a conventional cooled airfoil with bulk internal cavities or passages, it should be understood that the invention applies anywhere that turbulator can be utilized. This can include near-wall cooling passages and microcircuit cooling passages, as well as extension to all cooled components including vanes, blades, shrouds, combustor liners and deflectors, endwalls, platforms or otherwise. Additionally, the turbulator is shown in a typical form, and it is contemplated that the turbulator can also comprise a trip strip or rib roughener, as well as pins, bumps, vortex generators, chevrons, and so forth. Each element shares common features including a surface facing the cooling fluid flow and a surface obverse to the cooling fluid flow.

Figure 4:
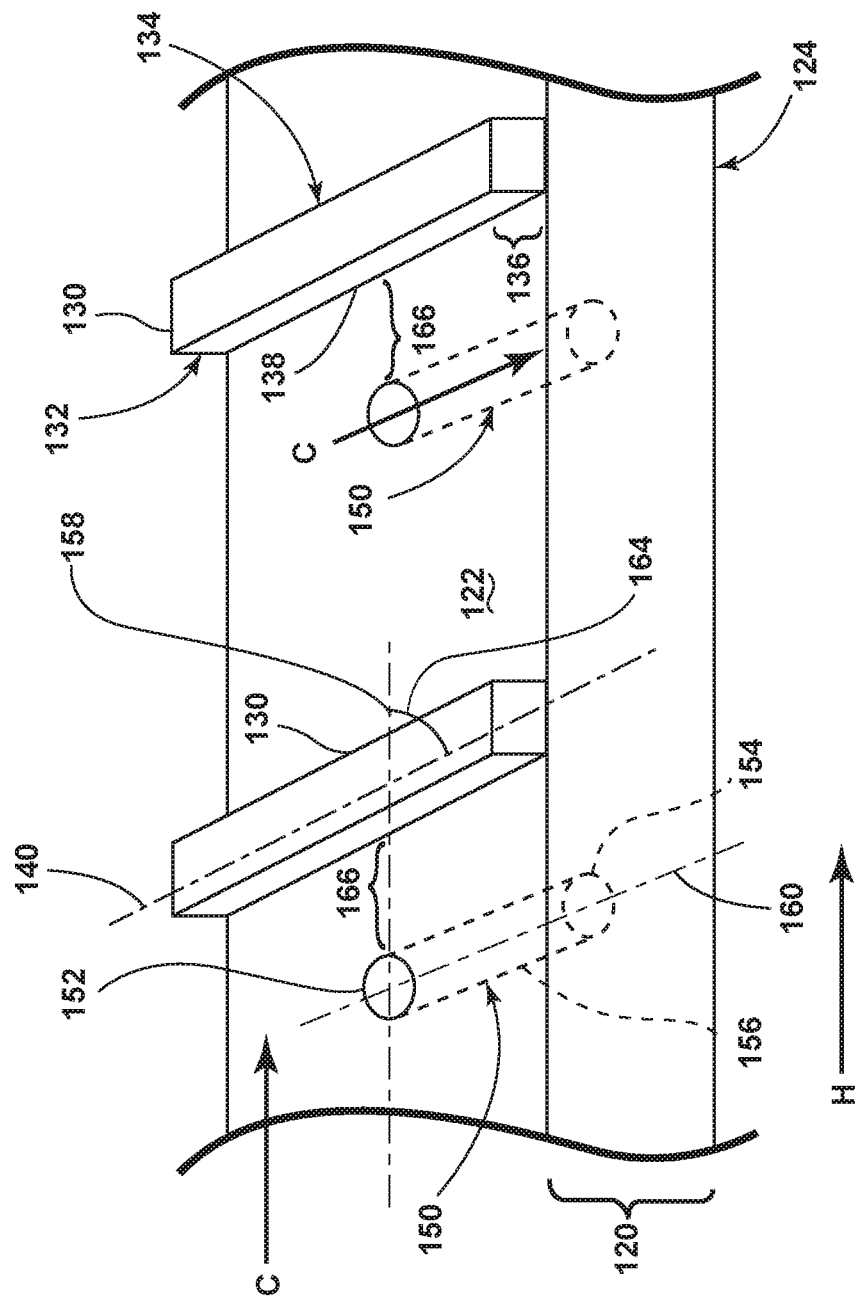
FIG. 4 is a perspective view of a portion of the engine component having a plurality of turbulators and film holes.

Turning now to FIG. 4, a portion of the engine component is illustrated as a wall 120 having a cooled surface 122, which can comprise a channel, adjacent to a flow of cooling fluid C and a hot surface 124 adjacent to a hot gas flow H. The cooled surface 122 can comprise a flat elongated surface or can comprise a channel defined adjacent to the cooling fluid flow C. A plurality of flow elements illustrated as turbulators 130 are disposed along the cooled surface 122. The turbulators 130 are quadrilateral-shaped, having a front 132 confronting the cooling fluid flow C and a rear 134 obverse to the cooling fluid flow C. Alternatively, the turbulator 130 can comprise other shapes, such as a curved, arcuate, triangular, or other shape, in non-limiting examples, such that a portion of the turbulator surface confronts the cooling fluid flow C and another portion is obverse to the cooling fluid flow C. The turbulator 130 can further comprise a height 136 defined by the distance of the front 132 or rear 134 of the turbulator 130 extends from the cooled surface 122. A corner 138 can be defined at the junction between the front 132 and the cooled surface 122. The turbulator 130 can define a turbulator axis 140 along the longitudinal length of the turbulator 130. Although FIG. 4 shows sharp edges and a sharp corner 138, it should be understood the such features are not limiting, and can comprise rounded corners or have finite fillets.

A plurality of film holes 150 can be disposed in the wall 120, having an inlet 152 on the cooled surface 122 and an outlet 154 on the hot surface 124 with a film hole passage 156 fluidly coupling the inlet 152 to the outlet 154. A cooling passage flow axis 158 can be transposed along the cooled surface 122 through the center of the inlet 152 and a film hole passage axis 160 can be defined along the center of the film hole passage 156. The cooling passage flow axis 158 can be parallel to the local direction of the cooling fluid flow C along the cooled surface 122 or can be parallel to the cooling channel directional axis. The local direction of the cooling fluid flow C may not be along the channel axis direction, and can be offset relative to the axial direction of the cooling channel. Therefore, the cooling passage flow axis 158 can be parallel to the local direction of the cooling fluid flow C, which may be altered by nearby turbulators 130 or throughout the engine component. A turbulator angle 164 can be defined between the turbulator axis 140 and the cooling passage flow axis 158, such that the turbulator 130 can be oriented at an angle relative to the flow of cooling fluid C.

The film hole inlets 152 can be located upstream of the turbulator 130. The film hole inlets 152 can be spaced from the turbulators 130 by a space 166 defined as a distance relative to the height 136 of the turbulator 130. For example, the space 166 can be within two turbulator heights 136 from the turbulator 130.

During operation, the flow of cooling fluid C is fed to the film hole 150 through the inlet 152 and exhausted through the outlet 154, providing a flow of cooling fluid C to the hot surface 124 to develop a film of cooling fluid along the hot surface 124.

Figure 5:
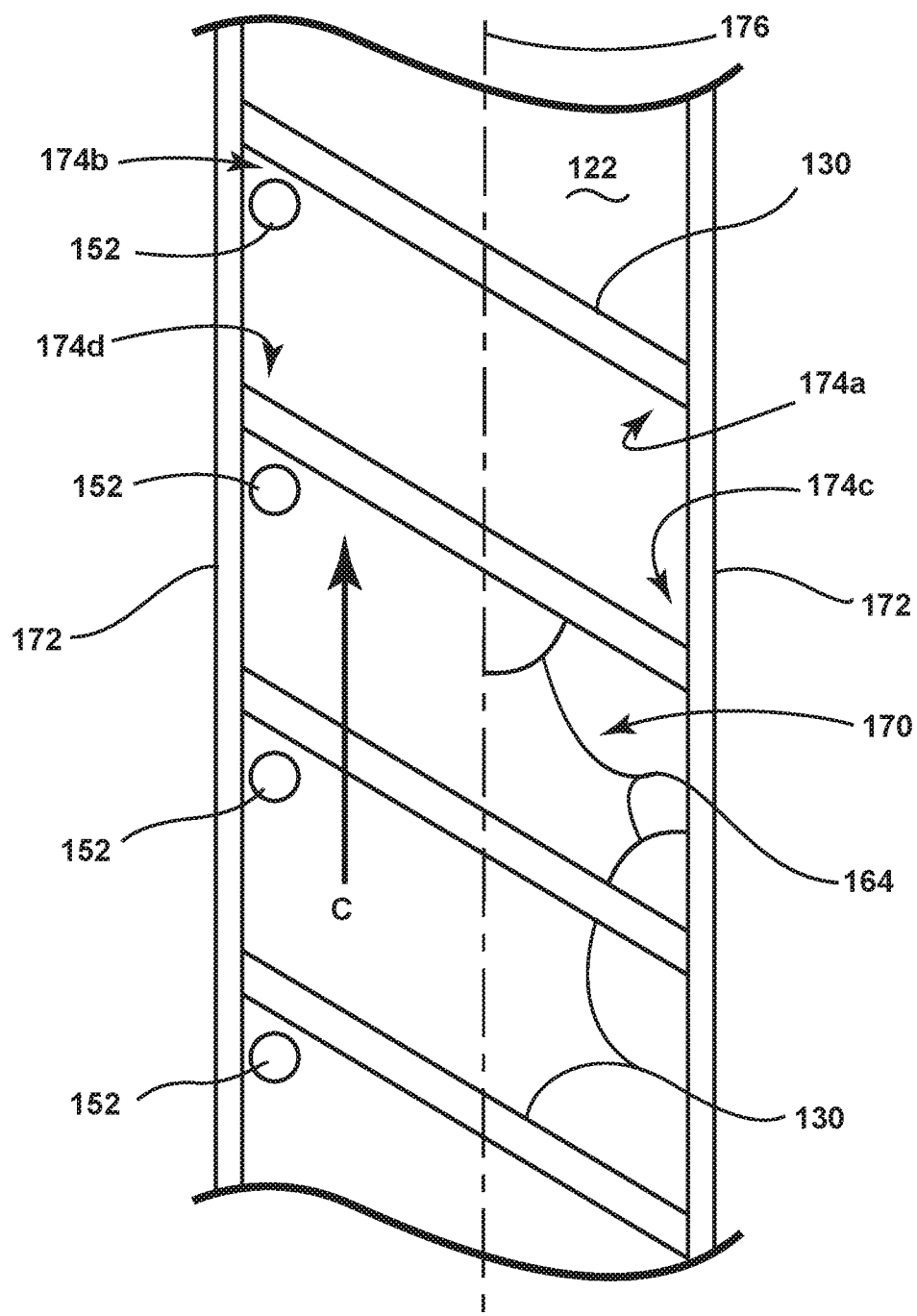
FIG. 5 is a top view of the engine component of FIG. 3 illustrating film hole inlets disposed relative to the turbulators.

Turning to FIG. 5, a top view of the cooled surface 122 is illustrated as a channel 170 disposed between two walls 172. The channel 170 can further comprise the cooled surface 122 which can be the cooled surface 122 of FIG. 4. A plurality of turbulators 130 are disposed along the channel 170 and can be organized in a flow-wise, spaced arrangement. Each turbulator 130 can define four corners with the walls 172, having two corners 174a, 174b disposed upstream of the turbulator 130 and two corners 174c, 174d disposed downstream of the turbulator 130. The channel can further define a channel axis 176, which can be parallel to the direction of the overall flow of cooling fluid C. The turbulators 130 can be angled at the turbulator angle 164, being relative to either the walls 172 or the channel axis 176. The turbulators 130 can be angled such that a first corner 174a is disposed upstream of a second corner 174b, and a third corner 174c is disposed upstream of a fourth corner 174d. The turbulators 130 can be disposed at the turbulator angle 164 having the second corner 174b, while being upstream of the turbulator 130 is disposed downstream of the third corner 174c relative to the flow of cooling fluid C. It should be appreciated that the corners as illustrated are exemplary, and that some corners can be disposed upstream or downstream of other corners, as can be defined by the turbulators 130, and are not limited by the particular disposition shown in FIG. 5.

The film hole inlets 152 can be disposed in the corners 174a-d. While FIG. 5 illustrates the film hole inlets 152 being disposed in the second corner 174b, it should be understood that the illustration is exemplary, and that the inlets 152 can be disposed in any corner 174a-d defined by the turbulator 130. Furthermore, while the inlets 152 are illustrated as adjacent to the turbulators 130, the inlets 152 can be spaced from the turbulators, such as by a length of two turbulator heights, in a non-limiting example.

It should be understood that while FIG. 5 is described as placing the film hole inlets 152 in the corners defined by the turbulators 130, it is further contemplated that the inlets 152 can be placed anywhere along the lateral disposition of the channel 170 or the turbulators 130 disposed therein. Furthermore, the inlets 152 can be spaced from the corners 174a-d. For example, the inlets 152 can be spaced from the corners within at least two turbulator heights.

Figure 6:
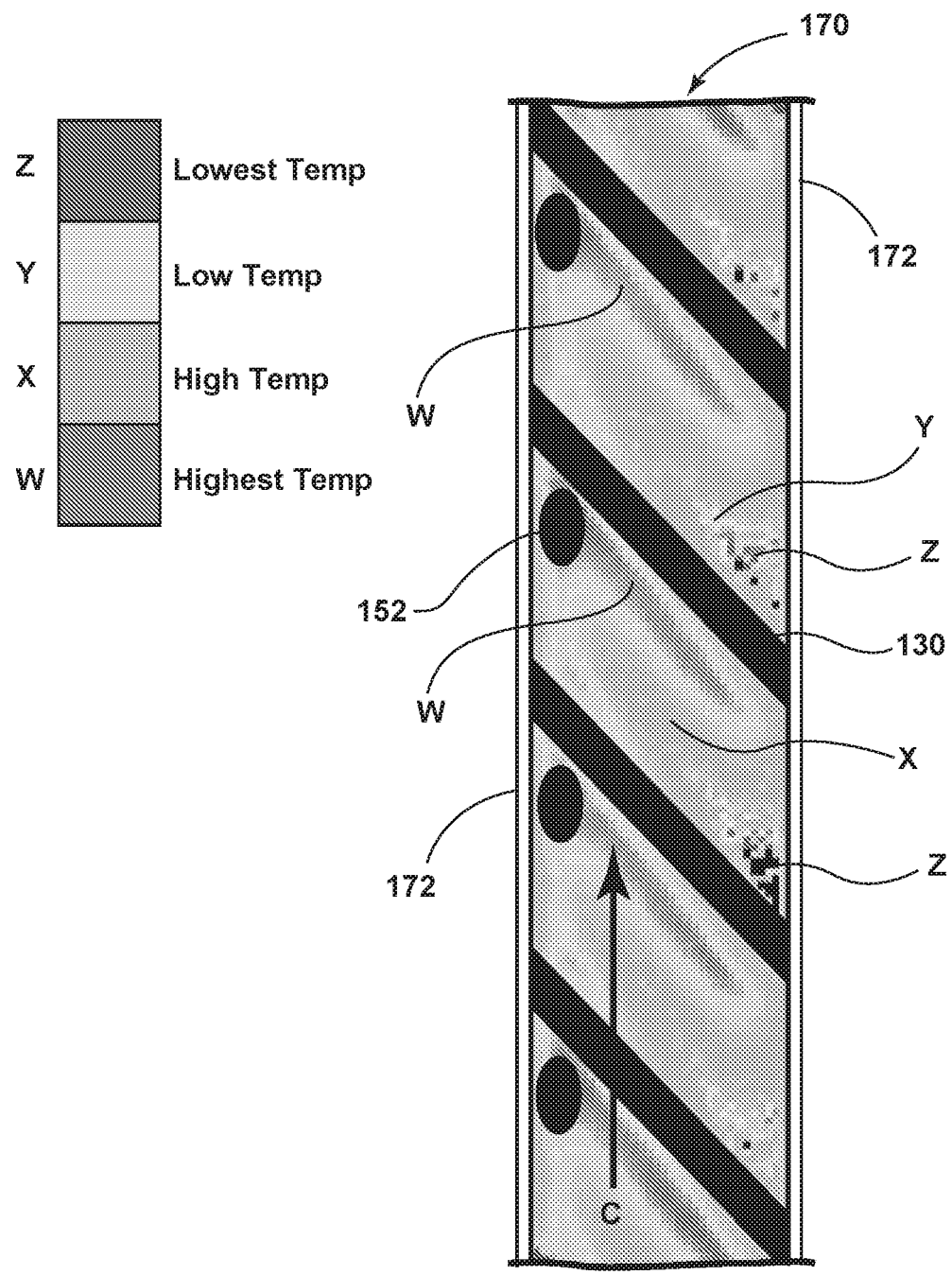
FIG. 6 is a temperature gradient plot illustrating variations of temperatures along the engine component of FIG. 5.

Looking at FIG. 6, a temperature gradient plot of the engine component of FIG. 5 prior to the addition and placement of film holes illustrates an increased temperature at the locations where film hole inlets 152 are later placed. The figure depicts that film hole inlets 152 are desirably placed in regions that experience higher material temperatures without the film hole inlets 152. The cooling fluid flow C helps to cool the internal surfaces of the cooling channel 170 (not shown in FIG. 6), having highest temperatures Z adjacent the turbulators 130. As the cooling fluid approaches the turbulators 130, the temperatures for the engine components increase to a highest temperature W from a high temperature X when flowing toward the inlets 152. Further from the inlets 152, the temperature becomes a low temperature Y, being downstream from a turbulator 130 and opposite in an upstream corner, while the lowest temperature Z is closest to that upstream corner downstream of the turbulator 130. Thus, placing the inlet 152 at the downstream corners can help reduce engine component temperatures, where a recirculating or stagnant flow can otherwise develop and increase internal temperatures. Thus, it should be appreciated that the placement of the inlets 152 relative to the turbulators 130 can be utilized to energize flow to the inlets as well as manage temperatures within the engine component. It should be appreciated that the flows as shown and described are exemplary, and that differing airflows and resultant temperatures are possible in various configurations.

It should be understood that the temperatures comprising the highest, high, low, and lowest temperatures Z, Y, X, W are temperatures relative to one another, and are not limited to particular temperatures or differences therebetween, as different engine components can have different internal temperatures throughout the engine.

Figure 7:
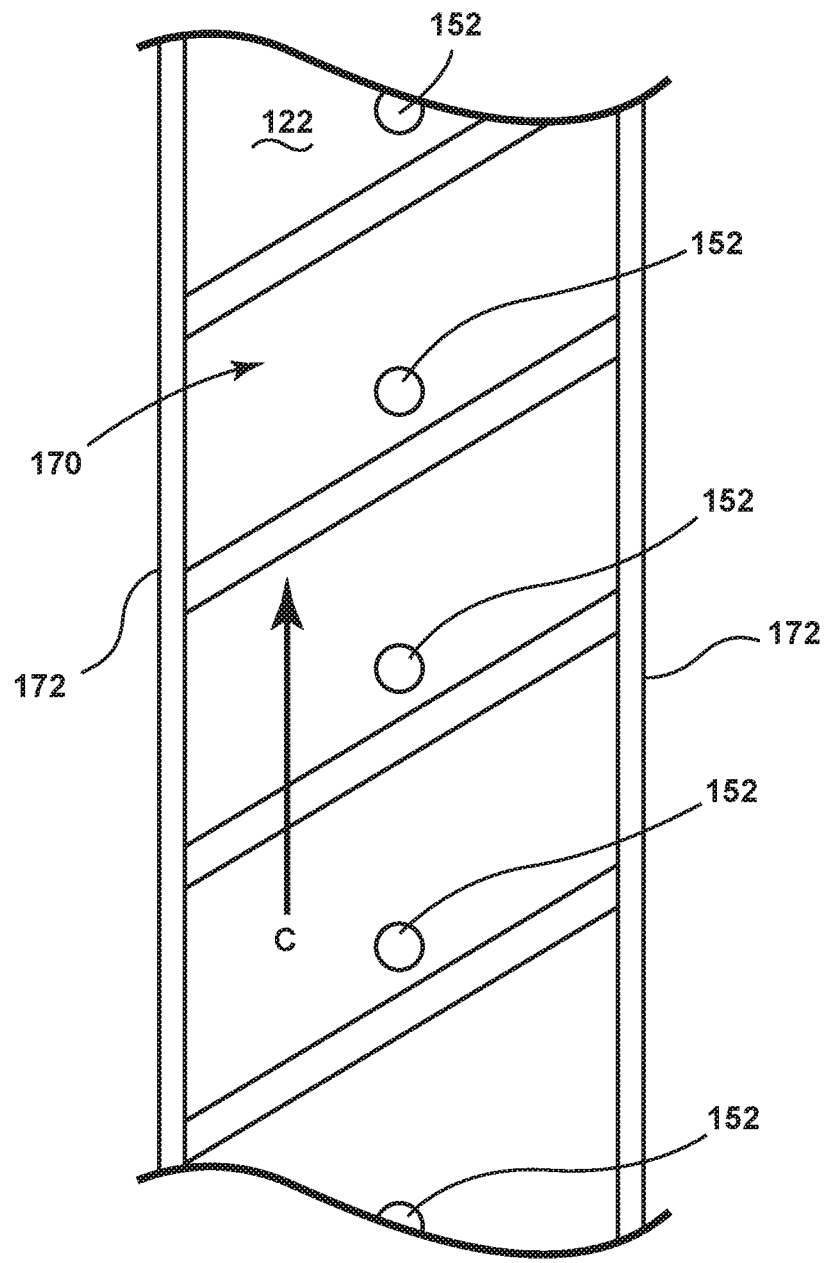
FIG. 7 is a top view of the engine component of FIG. 3 illustrating film hole inlets downstream of the turbulators.

Turning now to FIG. 7, the turbulators 130 are disposed along the channel at an angle opposite to that of FIG. 5. The film hole inlets 152, in a second example, are disposed downstream of the turbulator 130 as opposed to upstream of the turbulators 130 illustrated in FIGS. 4 and 5. The turbulators 130 can be adjacent to the turbulators 130, or spaced downstream therefrom. The inlets 152, for example, can be spaced from the turbulators 130 within at least a length of two turbulator heights.

It should be understood that while FIG. 4 illustrates film hole inlets 152 being disposed upstream of the turbulators 130 and FIG. 7 illustrates film hole inlets 152 downstream of the turbulators 130, the inlets 152 can be spaced centrally between the turbulators 130 such that the inlet is both upstream from one turbulator 130 and downstream from another turbulator 130. This distance between both the upstream and downstream turbulators 130 can be greater than two turbulator heights, such that the turbulation airflows near the turbulators 130 is avoided.

Turning now to FIG. 8, the turbulators can also comprise a chevron 180. The chevrons can be disposed within the channel 170 between the walls 172 defining the channel 170. The chevrons 180 can define upstream corners 182a, downstream corners 182b, and central corners 182c. The film hole inlets 152 are placed at an upstream corner 182a, however, it is contemplated that the inlets 152 can be placed at any corner 182a-c or spaced from the chevron 180 along any lateral position of the channel 170.

In FIG. 9, a plurality of chevrons 190 are reversed from the position of FIG. 8, defining two upstream corners 192a, two downstream corners 192b, and a central corner 192c. The inlets 152 are illustrated as being disposed in the central corners 192c, while it is contemplated that the inlets 152 can be placed in any corner 192a-c or spaced from a chevron 190 at any lateral position of the channel 170.

It should be appreciated that FIGS. 8 and 9 are not limited to placing inlets 152 in the corners 182a-c, 192a-c defined by the chevrons 180, 190 and can be placed within the spaces between the chevrons 180, 190 within the channel 170, while being spaced from at least one chevron 180, 190, within at least two chevron heights. Additionally, the inlets 152 can be spaced from the corners 182a-c, 192a-c, for example, within at least two chevron heights. Further still, the inlets 152 can be spaced between an upstream chevron 180, 190 and a downstream chevron 180, 190, being distanced from both chevrons 180, 190 by at least two chevron heights, being disposed outside of a turbulent airflow created by the chevrons 180, 190.

Placing the film holes relative to the turbulators can also comprise a method of cooling a cavity within a component of a gas turbine engine. The method can comprise directing air into an inlet of a film hole within two heights of a turbulator located downstream of the inlet. The air can be exhausted from the outlet to provide a cooling film along a hot surface of the component. The air can also be directed into an inlet disposed within two turbulator heights of a corner defined by the turbulator. Additionally, multiple film holes are contemplated, directing air into multiple film hole inlets.

It should be further appreciated that the examples described herein are non-limiting, and the inlets or film holes can be placed in one or more corners defined by turbulators or chevrons. Furthermore, the inlets or film holes can be placed in the spaces of the cooled surface between adjacent turbulators or chevrons and can be spaced therefrom. Spacing, for example, can be relative to the turbulator or chevron height, such as being spaced from the turbulator or chevron within at least two heights of the turbulator or chevron, or at least two turbulator heights from both an upstream and downstream turbulator or chevron. Furthermore, the inlets can be spaced from the corners by a distance, such as within two turbulator or chevron heights.

It should be understood that this disclosure relates to preferential placement of film hole inlets relative to turbulators inside of cooling passages or channels. The placement of the inlets relative to the turbulators improves film hole or film cooling performance, such as improving discharge coefficients and flow rates. The placement of film hole inlets relative to the turbulators can take advantage of or avoid flow patterns developed by the turbulators within the cooling passage. Placing the film hole within at least two turbulator heights from a turbulator or at least two turbulator heights from both an upstream and downstream turbulator can avoid an unsteady flow created by the turbulator. Turbulators can generate a recirculating flow adjacent the turbulator and spacing the inlet therefrom can avoid this recirculating flow, providing a steady flow to the film hole. Additionally, placing the inlets in a corner can help to prevent pressurized or stagnant regions within the passage, further improving flow efficiency and cooling.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a gas turbine engine, wherein the gas turbine engine generates a hot combustion gas flow, and provides a cooling fluid flow, the engine component comprising:
    a wall separating the hot combustion gas flow from the cooling fluid flow and having a hot surface in a hot combustion gas flow path and a cooled surface facing the cooling fluid flow;
    at least one turbulator comprising a chevron shape located on the cooled surface, extending between two walls defining a channel on the cooled surface and forming a continuous central corner at an apex of the chevron shape, and extending away from the cooled surface to define a turbulator height, and having a front confronting the cooling fluid flow and a rear obverse to the cooling fluid flow;
    at least one film hole having an inlet provided on the cooled surface, an outlet provided on the hot surface, and a passage connecting the inlet and the outlet, wherein the inlet of the at least one film hole is located at a distance of at least two turbulator heights from the front of the at least one turbulator at a location upstream of the continuous central corner with respect to the cooling fluid flow.

2. The engine component of claim 1, wherein the at least one turbulator is oriented at an angle relative to the channel.

3. The engine component of claim 1, wherein the passage forms an angle relative to the cooled surface.

4. The engine component of claim 1, wherein the at least one film hole comprises multiple film holes each having a corresponding inlet defining multiple inlets.

5. The engine component of claim 1, wherein the at least one turbulator comprises multiple turbulators located within the channel in a flow-wise spaced arrangement with respect to the cooling fluid flow.

6. A method of cooling a cavity within a component of a gas turbine engine comprising directing a flow of air into an inlet of a film hole, wherein the film hole is located between two adjacent turbulators of multiple spaced turbulators each comprising a chevron shape having a front confronting the air, and extending between two walls defining a channel and forming a continuous central corner at an apex of the chevron shape, and wherein the inlet is spaced at a distance of at least two turbulator heights from the front of the at least one turbulator at a location upstream of the continuous central corner with respect to the flow of air.

7. The method of claim 6, wherein the directing of the flow of air into the inlet of the film hole comprises directing the flow of air into multiple inlets located upstream of the turbulator of the two adjacent turbulators.

8. An engine component for a gas turbine engine, wherein the gas turbine engine generates a hot combustion gas flow, and provides a cooling fluid flow, the engine component comprising:
    a wall separating the hot combustion gas flow from the cooling fluid flow and having a hot surface in a hot combustion gas flow path and a cooled surface facing the cooling fluid flow;
    a channel formed in the cooled surface and extending in a flow-wise direction;
    multiple spaced turbulators each comprising a chevron shape located within the channel on the cooled surface, forming a continuous central corner at an apex of the chevron shape, and extending away from the cooled surface, each turbulator of the multiple spaced turbulators is defined by a turbulator height, and having a front confronting the cooling fluid flow and a rear obverse to the cooling fluid flow; and
    multiple film holes, each film hole of the multiple film holes having an inlet provided on the cooled surface and spaced a distance of at least two turbulator heights from the front at a location upstream of the continuous central corner, an outlet provided on the hot surface, and a passage connecting the inlet and the outlet.

9. The engine component of claim 8, wherein at least one of the multiple spaced turbulators form an angle with respect to the channel.

10. The engine component of claim 4 wherein the at least one turbulator forms at least one additional corner with one of the two walls defining the channel.

11. The engine component of claim 10 wherein at least one of the multiple inlets is located adjacent to the at least one additional corner.

12. The engine component of claim 8, wherein the engine component comprises two walls defining the channel and wherein the multiple spaced turbulators form at least one additional corner with one of the two walls defining the channel.

13. The engine component of claim 12 wherein at least one inlet of the multiple film holes is located adjacent to the at least one additional corner.

* * * * *